April 22, 1930.  B. C. ROOT  1,755,898
FIBER CONDUIT JOINT AND METHOD OF MAKING SAME
Filed June 7, 1926
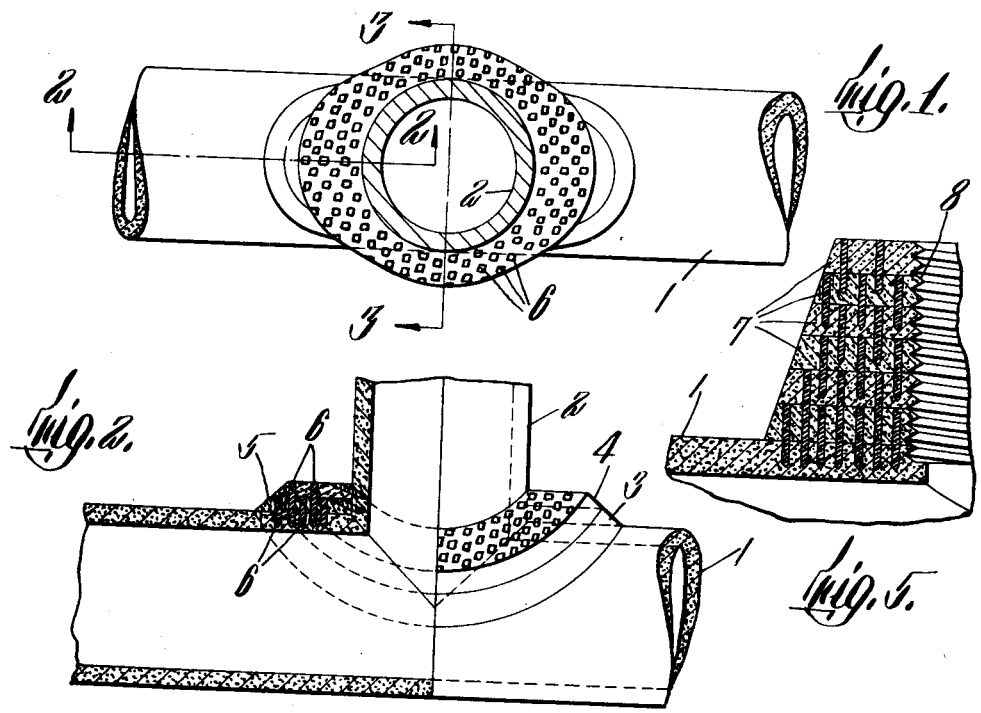
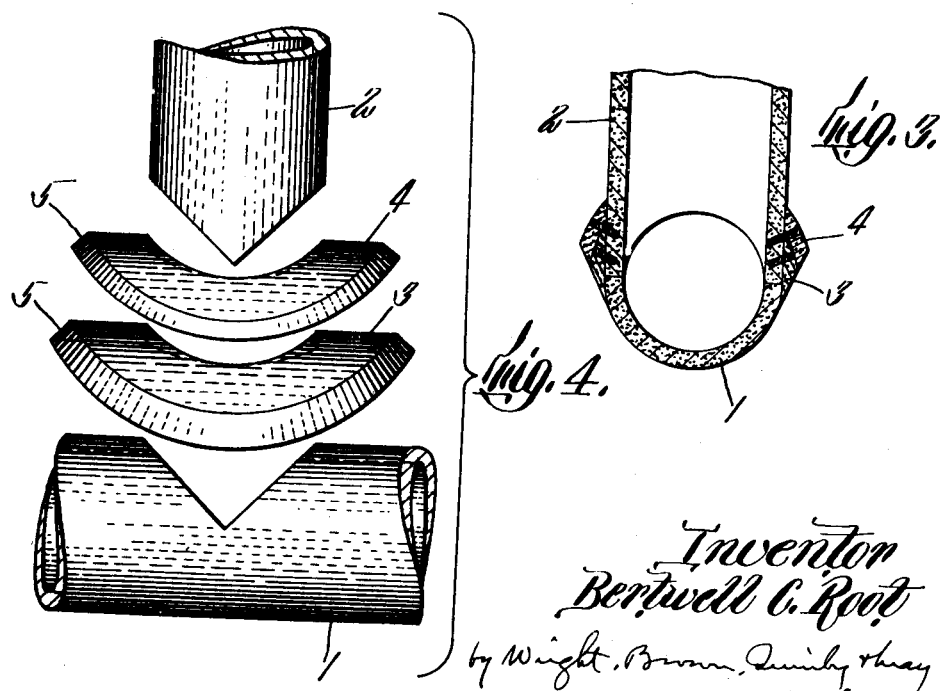
Inventor
Bertwell C. Root Patented Apr. 22, 1930

1,755,898

UNITED STATES PATENT OFFICE

BERTWELL C. ROOT, OF BERLIN, NEW HAMPSHIRE, ASSIGNOR TO BROWN COMPANY, OF BERLIN, NEW HAMPSHIRE, A CORPORATION OF MAINE

FIBER CONDUIT JOINT AND METHOD OF MAKING SAME

Application filed June 7, 1926. Serial No. 114,267.

This invention relates to joints between tubular conduits and a method of making the same, and is more particularly concerned with conduits composed of interfelted fibrous material saturated with a thermoplastic waterproofing material, such as pitch. Such conduits now find extensive use for electric cable or wiring systems and as fluid conductors.

In the manufacture of such conduits or tubes, it is customary to produce the conduit by winding a web of cellulose pulp (e. g., chemical, mechanical, or mixed pulp) about a mandrel until a wall of the desired thickness has been built up, after which the conduit is removed from the mandrel and dried. A conduit formed under such conditions is substantially homogeneous or non-laminated.

The dry tube is saturated with a thermoplastic waterproofing agent, such as pitch, bitumen, or other hydrocarbon waterproofing agent, which may be sufficiently liquefied by heat to penetrate into the conduit without scorching it. The waterproofing agent serves to strengthen and rigidify the conduit, as well as to increase its dielectric properties.

In laying a conduit system, it is sometimes necessary to lead off one conduit angularly from another. This invention provides a durable angular joint, the pieces of which are constructed entirely from conduit material and which may be made by a simple and efficient method.

In accordance with the method of this invention, the joint is made prior to treating the parts with the waterproofing agent. Initially, a suitable opening is cut through the wall of one conduit, and the end of the conduit branch to be angularly joined thereto is fitted in the cut wall and is then inserted in place to hold the branch in place. A series of superposed washers made of conduit material is fitted over the conduit to surround the opening and serves as a socket member for the reception of the branch. This socket member may be fastened to both conduits, and serves to maintain them in secured relation. The fastened parts may then be treated with waterproofing material in the usual manner.

For a more complete understanding of the present invention, reference may be had to the following more detailed description thereof, to be considered in conjunction with the accompanying drawings, wherein Figure 1 is a plan view of an angular joint.

Figure 2 is a side view of the same, partly in section, on the line 2—2 of Figure 1.

Figure 3 is an end section on the line 3—3 of Figure 1.

Figure 4 is a front view of the several parts of the joint, before assembly.

Figure 5 is a partial section through a plurality of superposed washers fastened to a conduit and internally threaded for engaging a branch.

Referring to the drawings, at 1 is shown a portion of a tubular fibrous conduit at which it is desired to lead off angularly a branch conduit 2. An opening is cut in the conduit 1, the form of opening herein shown being in the form of a V and intended for a rectangular or T joint. The end of a branch 2 is cut in the form of a V complemental with the cut of the wall of the conduit 1 at the opening. Curved washers 3 and 4 are fitted over and fastened to the conduit to surround the opening, the washers serving as a socket member for the reception of the branch 2. The washer 3 is cut from the wall of a conduit of an internal diameter equal to the external diameter of the conduit 1, and has an opening of sufficient diameter to allow the conduit 2 to be passed therethrough. The washer 4 is formed from a conduit of still larger diameter, to fit over the washer 3 and similarly has an opening of a size to allow the conduit 2 to be passed therethrough. As shown, the washers 3 and 4 are beveled at their outer edges 5 to present a smooth appearance. With the washers in place, the end of the branch 2 may be inserted into the V opening in the conduit 1 and may be held in place by coating the contacting surfaces with glue or other adhesive.

With the conduit 2 and washers 3 and 4 assembled in place, the washers may be fastened to both the conduits 1 and 2, the fasteners herein employed preferably being wooden pegs 6 similar to those sometimes employed in pegging shoes. As shown in Figures 1 and 2, the pegs are driven from both washers into the conduit 1 and also from their outer edge portions angularly into the conduit 2. To facilitate pegging, starting apertures of less length than the pegs may be initially formed in the fibrous material, and the pegs may then be driven into the unperforated material. Of course, where available, the usual shoe-pegging machine, which both forms the hole and drives the peg, may be employed. The branch conduit 2 is thus securely fastened to the conduit 1, and is not liable to become loosened therefrom, even when a considerable force is applied thereto.

After the branch 2 has been fastened in place, the entire structure is treated with a thermoplastic waterproofing agent, e. g., pitch, in a manner uniformly and thoroughly to saturate the fibrous material. The waterproofing agent further serves to bond together the parts at their junctures, and the resultant joint is durable, non-leaking and well-appearing, and constitutes in effect an integral construction. Obviously, any desired number of superposed washers may be employed as a socket for holding the branch 2 in place, the number and thickness determining the length of engagement within the socket.

Instead of fastening the conduit 2 to the socket by pegs, other provisions may be made, as by threading the end of the conduit 2 within the socket member. In Figure 5, I have shown an internally threaded socket member 8, provided for such purpose, the socket member being of sufficient length to ensure a firm retention of the branch conduit in place. In making this type of joint, the conduit 1 may be conditioned for the reception of a branch by fastening a series of superposed washers 7 (six being shown) tc the conduit surrounding the V opening foi the reception of the branch. The partly assembled joint is subjected to the usual waterproofing treatment with pitch or the like, after which the inner edges of the superposed series of washers 7 are threaded, as shown at 8, by means of a suitable threading tool. That end of a waterproofed conduit which has been threaded complemental to the internally threaded washers may then be screwed into the socket. The branch conduit is firmly engaged by the threads, so that it is not liable to become loosened therefrom.

While I have described the invention as embodied in a rectangular or T joint, it is, of course, understood that this type of joint is illustrative only. Furthermore, the washers for building up a socket to hold the branch in place may be built up from wet fibrous sheet material moulded to shape, rather than from a previously formed conduit.

Having thus described certain embodiments of this invention, it is obvious that they are susceptible of various changes and modifications without departing from the spirit or scope of invention as defined by the appended claims.

I do not herein claim broadly a method of joining fibrous conduits or conduit parts, which comprises pegging the conduits or conduit parts together and then saturating the same with waterproofing material, as this is disclosed and claimed in my application, Serial No. 108,673, filed May 12, 1926.

What I claim is:

1. A non-leaking fibrous joint comprising a tubular conduit having an opening for the angular reception of another conduit. a plurality of superposed, curved washers fitted over and pegged to said conduit surrounding the opening and serving as a socket member, and another tubular conduit fitted within and pegged to said socket member, said joint and pegs being saturated with a thermoplastic waterproofing agent.

2. A non-leaking fibrous joint comprising a tubular conduit having an opening for the angular reception of another conduit, a plurality of superposed, curved washers fitting over and pegged to said conduit, said washers being internally threaded, and another tubular conduit threaded within said washers, all the parts of said joint being saturated with a thermoplastic waterproofing agent.

In testimony whereof I have affixed my signature.

BERTWELL C. ROOT.